US011656242B2

(12) United States Patent
Sato

(10) Patent No.: US 11,656,242 B2
(45) Date of Patent: May 23, 2023

(54) ANGULAR VELOCITY DETECTION DEVICE, IMAGE DISPLAY APPARATUS, ANGULAR VELOCITY DETECTION METHOD, AND STORAGE MEDIUM

(71) Applicant: CANON KABUSHIKI KAISHA, Tokyo (JP)

(72) Inventor: Toshiaki Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 17/026,035

(22) Filed: Sep. 18, 2020

(65) Prior Publication Data

US 2021/0088550 A1   Mar. 25, 2021

(30) Foreign Application Priority Data

Sep. 25, 2019   (JP) .............................. JP2019-174087

(51) Int. Cl.
| G01P 15/14 | (2013.01) |
| G01P 15/18 | (2013.01) |
| G01P 15/16 | (2013.01) |
| G01C 25/00 | (2006.01) |
| G01P 21/00 | (2006.01) |

(52) U.S. Cl.
CPC ............ *G01P 15/14* (2013.01); *G01C 25/005* (2013.01); *G01P 15/165* (2013.01); *G01P 15/18* (2013.01); *G01P 21/00* (2013.01)

(58) Field of Classification Search
None
See application file for complete search history.

(56) References Cited

U.S. PATENT DOCUMENTS

| 10,007,350 B1* | 6/2018 | Holz ..................... G02B 27/017 |
| 2004/0113818 A1* | 6/2004 | Yokokohji .............. G06T 7/277 345/7 |
| 2009/0295722 A1* | 12/2009 | Yamamoto ............ G06F 3/0346 345/158 |

(Continued)

FOREIGN PATENT DOCUMENTS

| JP | 2003-203252 A | 7/2003 |
| JP | 2009-276242 A | 11/2009 |

OTHER PUBLICATIONS

Lauro Ojeda; "Personal Dead-reckoning System for GPS-denied Environments;" IEEE International Workshop on Safety, Security, and Rescue Robotics (SSRR2007), Rome, Italy, Sep. 27-29, 2007; pp. 1-6.

*Primary Examiner* — Raul J Rios Russo
*Assistant Examiner* — Carl F. R. Tchatchouang
(74) *Attorney, Agent, or Firm* — Canon U.S.A., Inc. IP Division

(57) ABSTRACT

An angular velocity detection device includes an angular velocity sensor configured to detect angular velocity, an acquisition unit configured to acquire orientation information in a three-dimensional space on a moving object including the angular velocity sensor, a calculation unit configured to calculate estimated angular velocity based on the acquired orientation information, and a correction unit configured to correct an output of the angular velocity sensor based on the angular velocity detected by the angular velocity sensor and the estimated angular velocity calculated by the calculation unit.

15 Claims, 8 Drawing Sheets

(56) References Cited

U.S. PATENT DOCUMENTS

| | | | |
|---|---|---|---|
| 2010/0273461 A1* | 10/2010 | Choi | G06F 1/1626 455/414.1 |
| 2011/0241656 A1* | 10/2011 | Piemonte | G01C 21/20 324/207.11 |
| 2015/0128699 A1* | 5/2015 | Maki | G01C 19/5776 73/504.02 |
| 2015/0285834 A1* | 10/2015 | Shibuya | G09B 19/0038 702/150 |
| 2017/0045736 A1* | 2/2017 | Fu | G02B 27/017 |
| 2017/0122739 A1* | 5/2017 | Kurashina | G01C 19/5776 |
| 2018/0075669 A1* | 3/2018 | Yeh | G06F 16/29 |
| 2020/0033825 A1* | 1/2020 | Otani | G01D 21/02 |

* cited by examiner

FIG.1
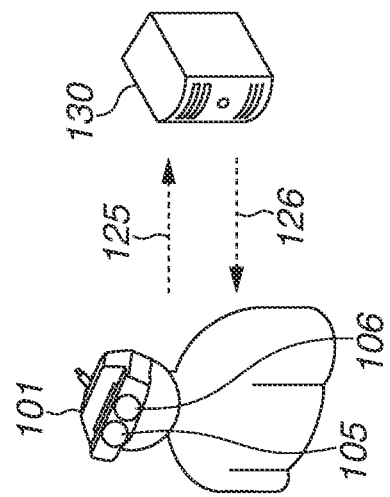
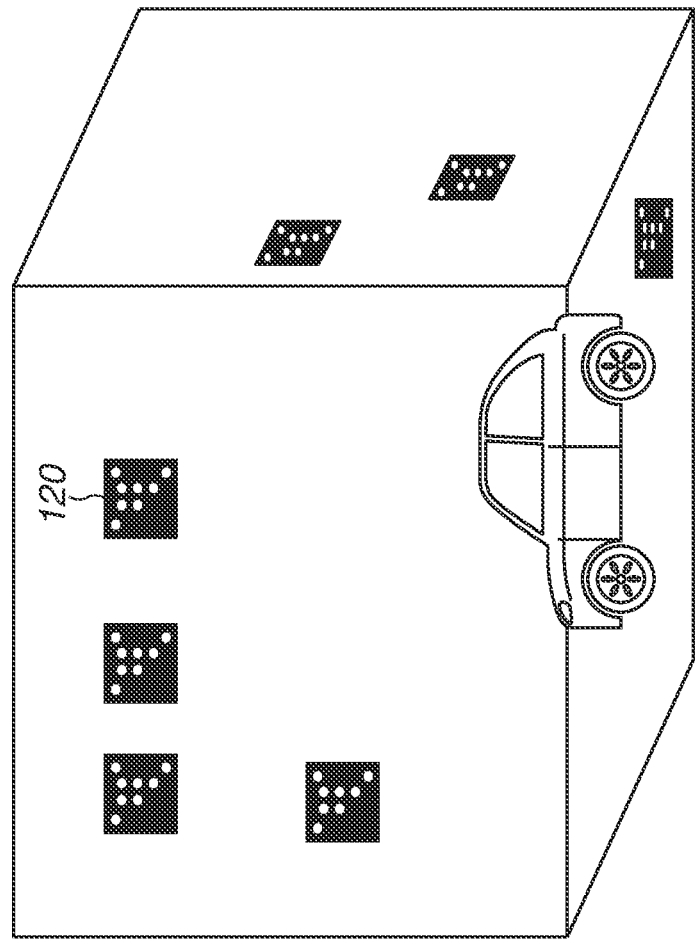

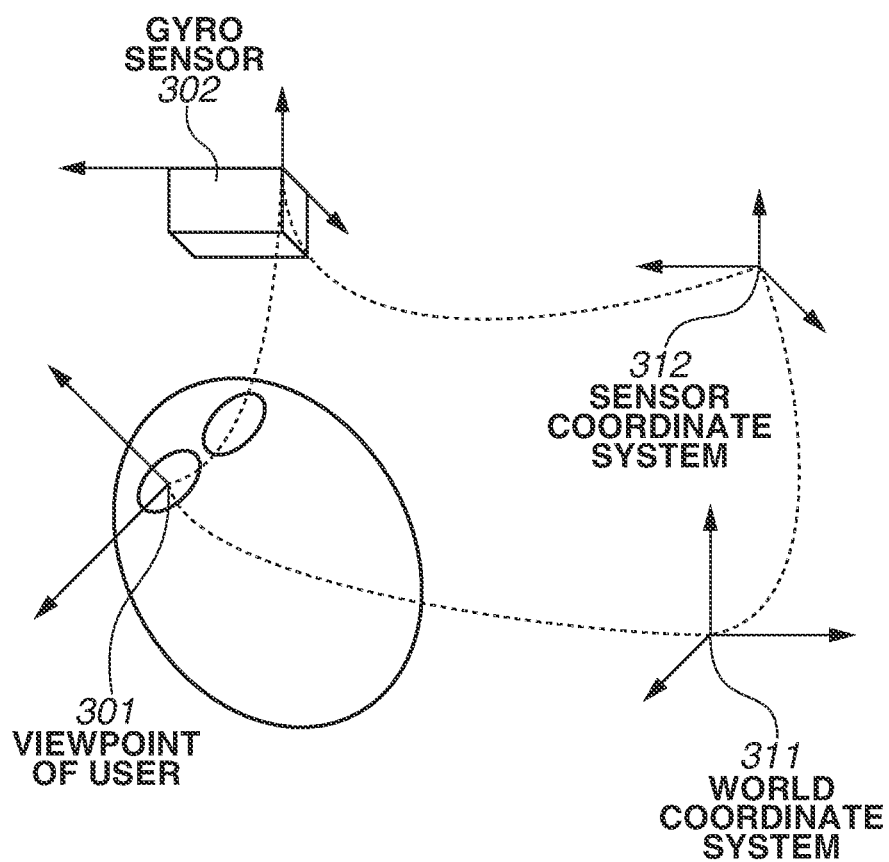

ANGULAR VELOCITY DETECTION DEVICE, IMAGE DISPLAY APPARATUS, ANGULAR VELOCITY DETECTION METHOD, AND STORAGE MEDIUM

BACKGROUND OF THE DISCLOSURE

Field of the Disclosure

The aspect of the embodiments relates to an angular velocity detection device, an image display apparatus, an angular velocity detection method, and a storage medium.

Description of the Related Art

A gyro sensor is a sensor that detects angular velocity. The gyro sensor has been used in autonomous navigation of automobiles and vessels. In recent years, the gyro sensor is also utilized in camera shake detection, orientation detection of a head mounted display, etc. Some of gyro sensors have characteristics that can change depending on environment conditions (temperature, vibration, acceleration, magnetism, etc.). Due to influence of the change in characteristics, an error occurs in a gyro output, and therefore a bias error occurs in a measured angular velocity. When angular velocity including the error is integrated to determine orientation of a moving object, bias drift occurs, which influences accuracy of orientation estimation of the moving object. Therefore, calibration of the gyro sensor is important.

Ojeda Lauro and Borenstein Johann, "Personal Dead-reckoning System for GPS-denied Environments", IEEE International Workshop on Safety, Security, and Rescue Robotics (SSRR2007) Rome Italy, Sep. 27-29, pp. 1 to 6, 2007 discusses a technology in which a gyro sensor is attached to a foot of a robot, and zero velocity update for updating bias of the velocity in a stationary state is performed by using the fact that the velocity is reset to zero every time the foot contacts a surface in walking. Further, Japanese Patent Application Laid-Open No. 2009-276242 discusses a technology in which bias of a detected angular velocity value is dynamically calibrated by using angular velocities determined from an output of a gyro sensor and an output of a moving object motion sensor different from the gyro sensor.

Meanwhile, in recent years, mixed reality (MR) for seamless combination of a real space and a virtual space has been actively studied. The MR includes a video see-through system and an optical see-through system. In the video see-through system, an image of a virtual space drawn by, for example, computer graphics is superimposed on an image of a real space captured by an imaging apparatus such as a video camera, and the superimposed image is displayed. In the optical see-through system, a display screen of a display apparatus is made optically transparent to allow a real space to be seen while an image of a virtual space is superimposed on real space on the display screen. In the MR technology, the gyro sensor is used to detect orientation of a moving object, such as a head mounted display. Japanese Patent Application Laid-Open No. 2003-203252 discusses a relative coordinate conversion method between a camera directed to a line of sight and a gyro sensor in a case where the gyro sensor is applied to the video see-through head mounted display.

The technology to calibrate the output of the gyro sensor include the technology discussed in the above-described paper by Ojeda et al. and the technology discussed in Japanese Patent Application Laid-Open No. 2009-276242. By the technology discussed in the above-described paper, however, since the zero update is performed in the stationary state, convenience may be impaired depending on an application in which the function for calibration is to be included. Further, in the technology discussed in Japanese Patent Application Laid-Open No. 2009-276242, a moving object motion sensor different from the gyro sensor is additionally required.

SUMMARY OF THE DISCLOSURE

According to an aspect of the embodiments, an angular velocity detection device includes an angular velocity sensor configured to detect angular velocity, an acquisition unit configured to acquire orientation information in a three-dimensional space on a moving object including the angular velocity sensor, a calculation unit configured to calculate estimated angular velocity based on the orientation information acquired by the acquisition unit, and a correction unit configured to correct an output of the angular velocity sensor based on the angular velocity detected by the angular velocity sensor and the estimated angular velocity calculated by the calculation unit.

Further features of the disclosure will become apparent from the following description of exemplary embodiments with reference to the attached drawings.

BRIEF DESCRIPTION OF THE DRAWINGS

FIG. 1 is a diagram illustrating a mixed reality (MR) system as an application example of an exemplary embodiment of the disclosure.

FIG. 3 is a diagram illustrating coordinate relationship between a gyro sensor and user orientation.

DESCRIPTION OF THE EMBODIMENTS

Some exemplary embodiments of the disclosure are described below with reference to drawings.

A first exemplary embodiment of the disclosure is described. FIG. 1 is a diagram illustrating a configuration example in a case where an angular velocity detection device according to the present exemplary embodiment is applied to a mixed reality (MR) system. The MR system illustrated in FIG. 1 includes a video see-through head mounted display (HMD) 101, which is worn by a user, and a personal computer (PC) 130 serving as an image processing apparatus. The HMD 101 uses, for example, orientation detection markers 120 to detect orientation based on a position and a direction of the HMD 101.

The HMD 101 includes a right camera 105 and a left camera 106 that capture an image of a visual field area of an HMD user. In this example, position orientation detection images are extracted from captured images captured by the right camera 105 and the left camera 106, and data of the position orientation detection images is analyzed to detect a position and orientation in a three-dimensional space. The orientation detection method using analysis of the position orientation detection images includes a plurality of systems.

As an example, a marker position orientation detection system is described with reference to FIG. 1. In the marker position orientation detection system, the markers 120 are detected from the image data obtained by imaging, and information such as a size, a shape, and a fill pattern of each of the detected markers is acquired. Relative positional relationship in the three-dimensional space between the markers and the HMD 101 and orientation information about a direction in which the user of the HMD 101 observes the markers can be calculated from the information. In the present example, the plurality of markers is used and positional relationship among the markers is previously defined as index arrangement information. Therefore, it is possible to calculate the direction in which the user of the HMD 101 observes the markers, based on the relative positional relationship. Accordingly, in place of the marker that allows for identification of the direction by the internal fill pattern, a marker having one-dimensional information not including directional information, for example, a color marker and a light-emitting device such as a light emitting diode (LED) can also be used.

Figure 2B:
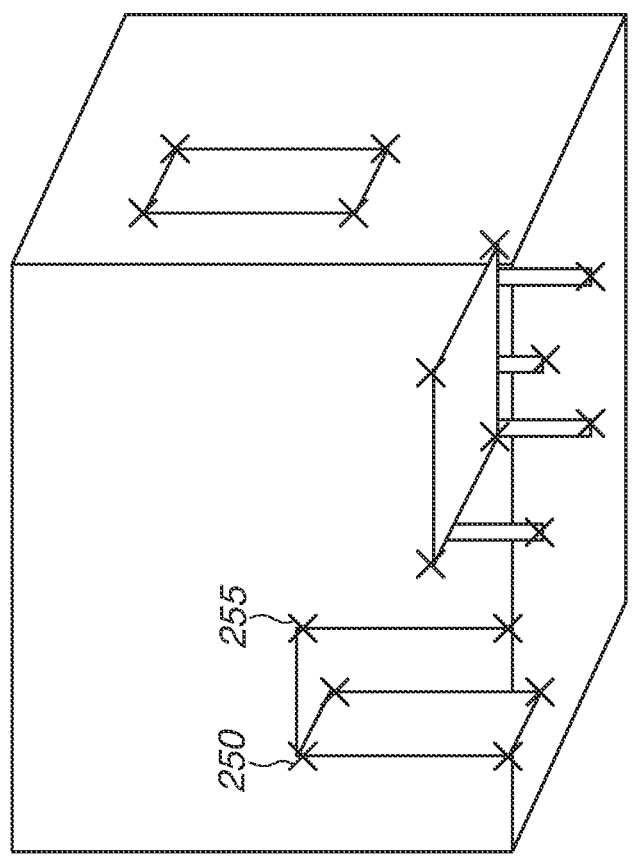
FIGS. 2A and 2B are diagrams illustrating the MR system using natural feature points.
Figure 2A:
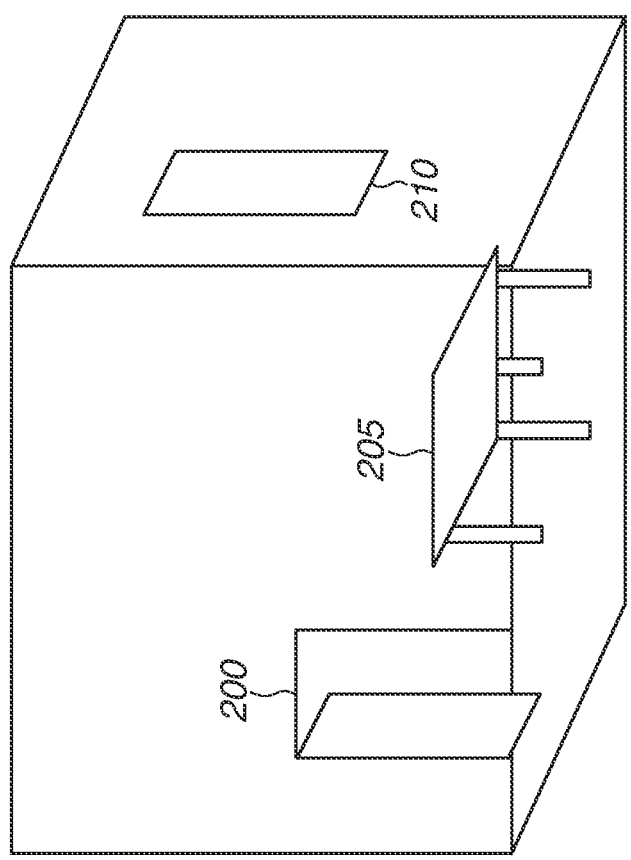

Further, in place of the marker position orientation detection system illustrated in FIG. 1, a natural feature position orientation detection system may be adopted. In the natural feature position orientation detection system, as illustrated in FIG. 2A, for example, the orientation information in the three-dimensional space is calculated by using natural feature points in outlines of a door 200, a table 205, and a window 210 in the image, a specific color in the image, etc. Further, as illustrated in FIG. 2B, the orientation information in the three-dimensional space is calculated by using, for example, natural feature points using a part of the feature points of the door 200 illustrated by X marks 250 and 255 in the image.

As another method, a plurality of the same types of markers may be used, a plurality of types of markers may be used at the same time, or a system combining the marker position orientation detection and the natural feature position orientation detection that uses the marker information and the information on the feature points in the image as a combination may be used. Using these systems enhances generation of precise orientation information in the three-dimensional space.

The HMD 101 includes a gyro sensor (angular velocity sensor) that detects an angular velocity for orientation detection, and regularly measures a movement rotation amount of the HMD 101 at a predetermined sampling frequency. The HMD 101 further includes an image display unit that displays an image to the HMD user. The PC 130 receives a captured image 125 as an image of a real space captured by the HMD 101, generates a combined image 126 that is obtained by superimposing an image of a virtual space drawn by a computer graphics or the like on the captured image 125, and transmits the combined image 126 to the HMD 101. The captured image as the image of the real space and the image of the virtual space are combined with reference to, for example, the angular velocity detected by the gyro sensor of the HMD 101. The MR system provides the combined image (MR image) in which the real space and the virtual space are combined, to the user of the HMD 101 in the above-described manner.

FIG. 3 is a diagram illustrating coordinate relationship between a viewpoint 301 of a user and a gyro sensor (angular velocity sensor) 302. Orientation information at the viewpoint 301 of the user is orientation information in a world coordinate system 311. To handle the information at the viewpoint 301 of the user and the information on the gyro sensor 302 in the same coordinate system, coordinate conversion between the world coordinate system 311 and the sensor coordinate system 312 is performed. In this example, the orientation information at the viewpoint 301 of the user in the world coordinate system 311 is converted into orientation information in the sensor coordinate system 312 by using coordinate correction information for coordinate conversion between a sensor output value and three-dimensional orientation at the viewpoint in the world coordinate system. For example, the orientation information at the viewpoint 301 of the user in the world coordinate system 311 can be converted into the orientation information in the sensor coordinate system 312 by using a coordinate conversion method and a coordinate correction information acquisition method discussed in Japanese Patent Application Laid-Open No. 2003-203252.

Figure 4:
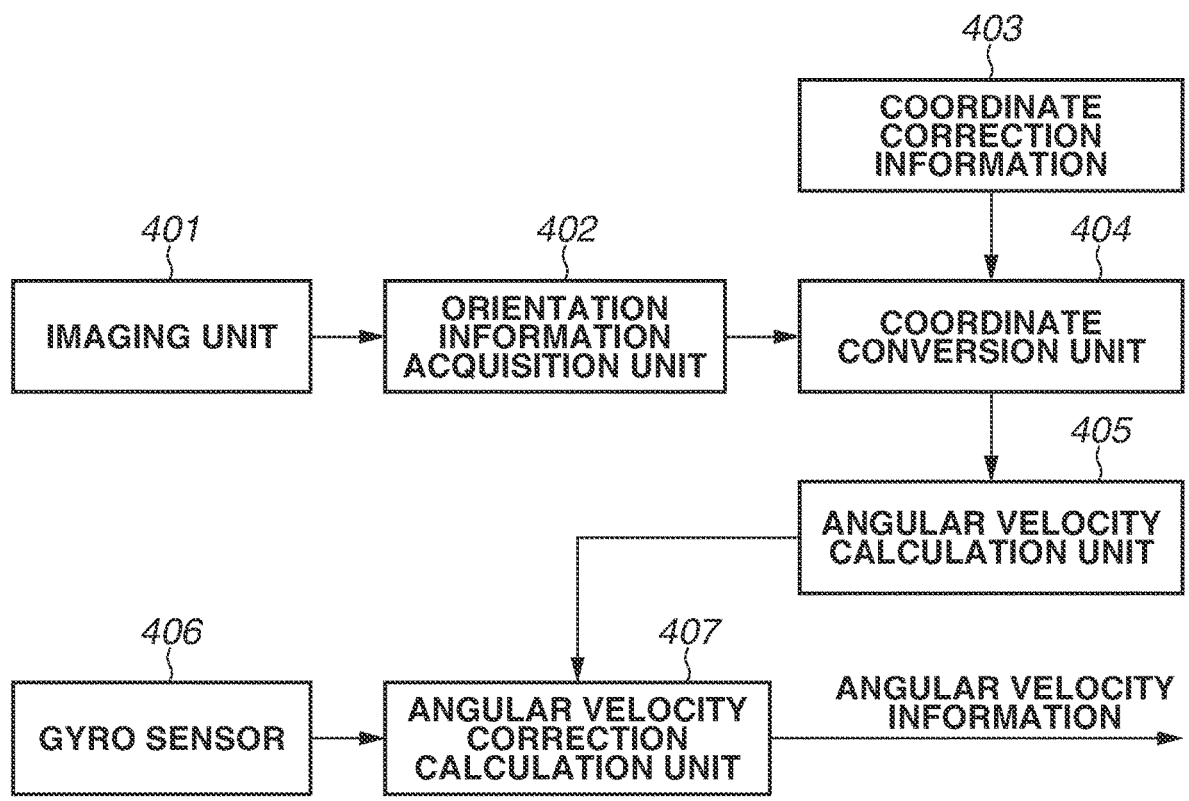
FIG. 4 is a diagram illustrating a configuration example of an angular velocity detection device according to a first exemplary embodiment.

FIG. 4 is a block diagram illustrating a configuration example of the angular velocity detection device according to the first exemplary embodiment. The angular velocity detection device includes an imaging unit 401, an orientation information acquisition unit 402, coordinate correction information 403, a coordinate conversion unit 404, an angular velocity calculation unit 405, a gyro sensor (angular velocity sensor) 406, and an angular velocity correction calculation unit 407.

The imaging unit 401 corresponds to the right camera 105 and the left camera 106 included in the HMD 101 and captures images in the visual field area of right and left eyes of the user. The orientation information acquisition unit 402 acquires orientation information on the user in the three-dimensional space from the images captured by the imaging unit 401. The orientation information acquired in the present exemplary embodiment is orientation information at the viewpoint of the user in the world coordinate system. Therefore, the coordinate conversion unit 404 converts the user orientation information into the orientation information in the sensor coordinate system based on the gyro sensor 406 by using the coordinate correction information 403 previously acquired.

The angular velocity calculation unit 405 receives the orientation information in the sensor coordinate system from the coordinate conversion unit 404, and calculates an estimated angular velocity $\omega_o = (\omega_x, \omega_y, \omega_z)$ from orientation information $q_o = (q_x, q_y, q_z, q_w)$. The orientation information $q_o$ can be converted into the estimated angular velocity $\omega_o$ by using the following simultaneous equations derived from a general formula. The estimated angular velocity $\omega_o$ calculated by the angular velocity calculation unit 405 is output to the angular velocity correction calculation unit 407.

$$\begin{cases} \frac{2(q_{wn} - q_{wn-1})}{\Delta t} = (-\omega_x \cdot q_{xn-1} - \omega_y \cdot q_{yn-1} - \omega_z \cdot q_{zn-1}) \\ \frac{2(q_{xn} - q_{xn-1})}{\Delta t} = (\omega_x \cdot q_{wn-1} - \omega_y \cdot q_{zn-1} + \omega_z \cdot q_{yn-1}) \\ \frac{2(q_{yn} - q_{yn-1})}{\Delta t} = (\omega_x \cdot q_{zn-1} + \omega_y \cdot q_{wn-1} - \omega_z \cdot q_{xn-1}) \\ \frac{2(q_{zn} - q_{zn-1})}{\Delta t} = (-\omega_x \cdot q_{yn-1} + \omega_y \cdot q_{xn-1} + \omega_z \cdot q_{wn-1}) \end{cases}$$

While, in the present exemplary embodiment, the orientation information is represented as quaternion, the orientation information is not limited thereto. It is sufficient to derive the estimated angular velocity from the orientation information, and the orientation information may be represented by, for example, a 3 by 3 rotation matrix, or roll, pitch, and yaw.

The gyro sensor 406 corresponds to the gyro sensor included in the HMD 101, and detects the angular velocity of the HMD 101 as a moving object at predetermined sampling timing. Angular velocity $\omega_g$ acquired by the gyro sensor 406 is output to the angular velocity correction calculation unit 407.

The angular velocity $\omega_g$ and the estimated angular velocity $\omega_o$ are represented by the following expressions, $$\omega_g = \omega_{g\_sig} + \omega_{bias} + \omega_{g\_noise}, \omega_o = \omega_{o\_sig} + \omega_{o\_noise}$$

where, in the angular velocity $\omega_g$, $\omega_{g\_sig}$ is a signal component of the angular velocity, $\omega_{bias}$ is zero-point bias, and $\omega_{g\_noise}$ is white noise included in the output of the gyro sensor 406. The estimated angular velocity $\omega_o$ similarly includes a signal component $\omega_{o\_sig}$ and white noise $\omega_{o\_noise}$.

The angular velocity $\omega_g$ acquired by the gyro sensor 406 and the estimated angular velocity $\omega_o$ calculated by the angular velocity calculation unit 405 are input to the angular velocity correction calculation unit 407. The angular velocity correction calculation unit 407 derives the zero-point bias $\omega_{bias}$ by using the input angular velocity $\omega_g$ and the input estimated angular velocity $\omega_o$, and performs zero-point calibration of the gyro sensor 406. For example, the angular velocity correction calculation unit 407 uses a Kalman filter to dynamically estimate the zero-point bias $\omega_{bias}$. The method of deriving the zero-point bias is not limited thereto, and the zero-point bias may be derived by the other method.

Figure 5:
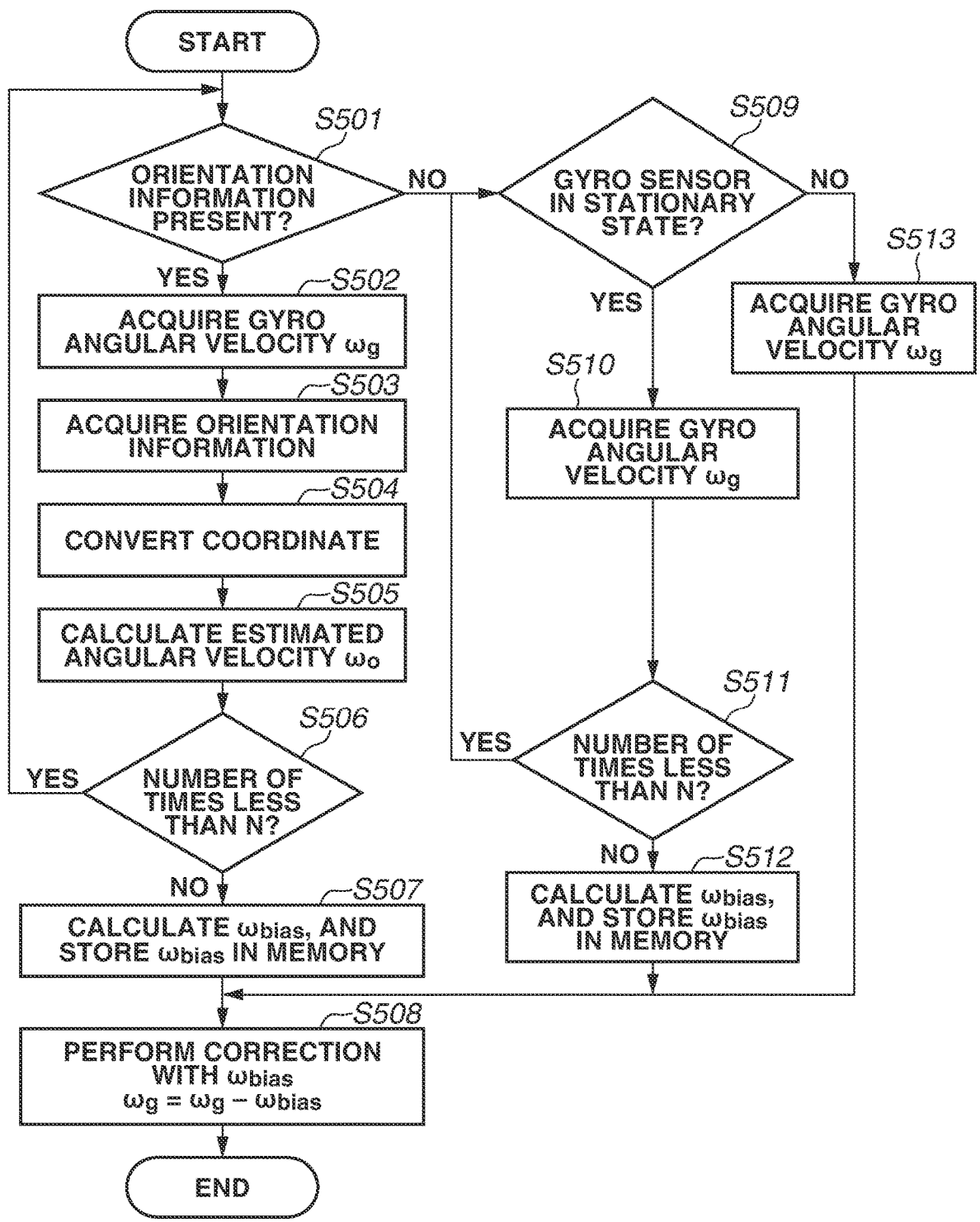
FIG. 5 is a flowchart illustrating an example of angular velocity detection processing according to the first exemplary embodiment.

FIG. 5 is a flowchart illustrating an example of the angular velocity detection processing by the angular velocity detection device according to the first exemplary embodiment. In the processing illustrated in FIG. 5, the angular velocity $\omega_g$ and information about presence/absence of the orientation information have been already acquired as an initial condition. In step S501, the angular velocity detection device determines presence/absence of the orientation information. In a case where the user orientation information is determined from the images captured by the imaging unit 401, the orientation information can be acquired only when the feature points in the imaging space are captured by the imaging unit 401. In a case where it is determined that the orientation information is present (YES in step S501), the processing proceeds to step S502. In a case where it is determined that the orientation information is absent (NO in step S501), the processing proceeds to step S509.

In step S502, the angular velocity correction calculation unit 407 acquires the angular velocity $\omega_g$ detected by the gyro sensor 406. In step S503, the orientation information acquisition unit 402 acquires the user orientation information in the three-dimensional space from the images captured by the imaging unit 401. The user orientation information acquired in step S503 is orientation information in the world coordinate system. Next, in step S504, the coordinate conversion unit 404 performs the coordinate conversion on the orientation information in the world coordinate system acquired in step S503, to convert the orientation information into the orientation information in the sensor coordinate system. Subsequently, in step S505, the angular velocity calculation unit 405 calculates the estimated angular velocity $\omega_o$ from the orientation information in the sensor coordinate system converted in step S504. The processing order of the processing in step S502 is not limited to the processing order illustrated in FIG. 5, and the processing in step S502 may be performed at any timing after the processing in step S501 and before processing in step S506.

Next, in step S506, the angular velocity detection device determines whether the number of execution times of the processing in steps S502 to S505 is less than a designated number of times N. In a case where it is determined that the number of execution times of the processing in steps S502 to S505 is less than the designated number of times N (YES in step S506), the processing returns to step S501. Meanwhile, in a case where it is determined that the number of execution times of the processing in steps S502 to S505 is not less than the designated number of times N, namely, in a case where it is determined that the processing in steps S502 to S505 is performed the designated number of times N (NO in step S506), the processing proceeds to step S507. In step S507, the angular velocity correction calculation unit 407 calculates the zero-point bias $\omega_{bias}$ based on the angular velocity $\omega_g$ and the estimated angular velocity $\omega_o$ acquired by the above-described processing, and stores the zero-point bias $\omega_{bias}$ in the memory.

In step S508, the angular velocity correction calculation unit 407 corrects the angular velocity $\omega_g$ from the gyro sensor 406 by using the zero-point bias $\omega_{bias}$, and outputs the corrected angular velocity $\omega_g$. As a result, the output of the gyro sensor 406 can be appropriately corrected by using the zero-point bias $\omega_{bias}$.

In a case where it is determined in step S501 that the orientation information is absent (NO in step S501), control to perform zero-point calibration of the gyro sensor 406 in the stationary state is performed. In step S509, the angular velocity detection device determines whether the gyro sensor 406 is in the stationary state. The determination whether the gyro sensor 406 is in the stationary state is performed based on, for example, whether the angular velocity $\omega_g$ is lower than or equal to a threshold. In a case where it is determined that the gyro sensor 406 is in the stationary state (YES in step S509), the processing proceeds to step S510. In a case where it is determined that the gyro sensor 406 is not in the stationary state (NO in step S509), the processing proceeds to step S513.

In step S510, the angular velocity correction calculation unit 407 acquires the angular velocity $\omega_g$ detected by the gyro sensor 406. Next, in step S511, the angular velocity detection device determines whether the number of execution times of the processing in step S510 is less than the designated number of times N. In a case where it is determined that the number of execution times of the processing in step S510 is less than the designated number of times N (YES in step S511), the processing returns to step S509. Meanwhile, in a case where it is determined that the number of execution times of the processing in step S510 is not less than the designated number of times N, namely, in a case where it is determined that the processing in step S510 is performed the designated number of times N (NO in step S511), the processing proceeds to step S512. In step S512, the angular velocity correction calculation unit 407 calculates the zero-point bias $\omega_{bias}$ based on the angular velocity $\omega_g$ acquired by the above-described processing, and stores the zero-point bias $\omega_{bias}$ in the memory. The processing then proceeds to step S508.

In the case where it is determined in step S509 that the gyro sensor 406 is not in the stationary state, the processing proceeds to step S513. In step S513, the angular velocity correction calculation unit 407 acquires the angular velocity $\omega_g$ detected by the gyro sensor 406. The processing then proceeds to step S508. In this case, the zero-point bias $\omega_{bias}$ is not calculated. In a case where the zero-point bias $\omega_{bias}$ has been already calculated, the angular velocity $\omega_g$ from the gyro sensor 406 is corrected by using the known zero-point bias $\omega_{bias}$.

The processing illustrated in FIG. 5 is periodically performable. Further, start of the execution of the processing illustrated in FIG. 5 can be instructed from a user interface. In this case, the user can start the correction at any timing.

According to the first exemplary embodiment, the zero-point calibration of the gyro sensor 406 can be dynamically performed by using the estimated angular velocity that is calculated based on the orientation information on the HMD 101, which makes it possible to improve convenience of the system that originally requires the zero-point calibration in the stationary state. Further, it is possible to perform the zero-point calibration of the angular velocity sensor with the simple system configuration in which another moving object sensor other than the gyro sensor is not included.

Next, a second exemplary embodiment of the disclosure is described. In the following, differences from the above-described first exemplary embodiment are described.

Figure 6:
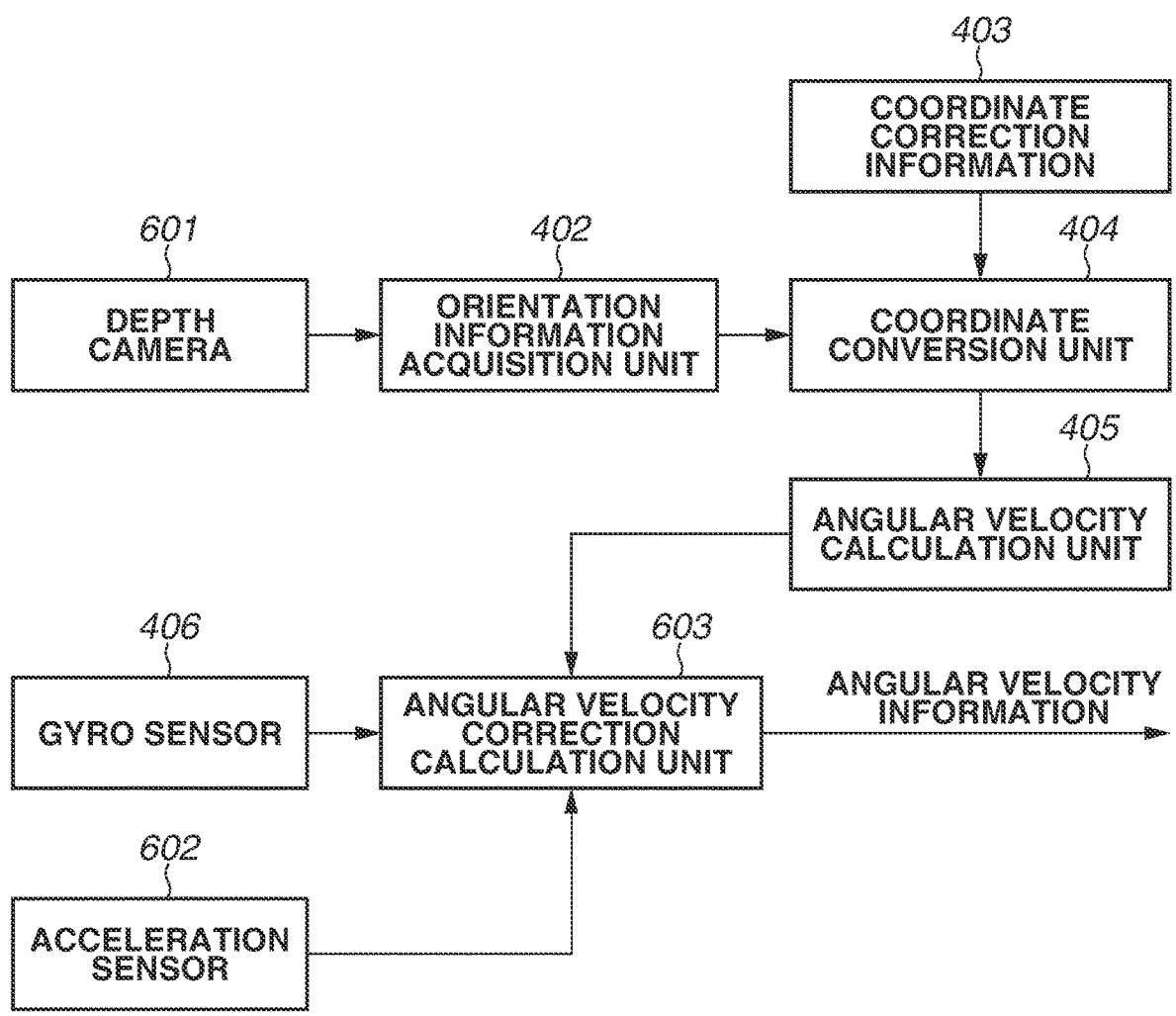
FIG. 6 is a diagram illustrating a configuration example of an angular velocity detection device according to a second exemplary embodiment.

FIG. 6 is a block diagram illustrating a configuration example of an angular velocity detection device according to the second exemplary embodiment. In FIG. 6, a component having the function same as the component illustrated in FIG. 4 is denoted by the same reference numeral, and redundant descriptions are omitted. The angular velocity detection device includes the orientation information acquisition unit 402, the coordinate correction information 403, the coordinate conversion unit 404, the angular velocity calculation unit 405, the gyro sensor (angular velocity sensor) 406, a depth camera 601, an acceleration sensor 602, and an angular velocity correction calculation unit 603.

More specifically, the angular velocity detection device according to the second exemplary embodiment is different from the first exemplary embodiment in a configuration in which the imaging unit 401 is replaced with the depth camera 601, and the acceleration sensor 602 for variation determination is added. The depth camera 601 captures a depth image in which each pixel of a captured image represents a distance. The depth camera 601 acquires a depth image by using invisible light such as infrared light. The acceleration sensor 602 detects moving acceleration of the HMD 101 as the moving object.

The angular velocity $\omega_g$ acquired by the gyro sensor 406, the estimated angular velocity $\omega_o$ calculated by the angular velocity calculation unit 405, and acceleration acc acquired by the acceleration sensor 602 are input to the angular velocity correction calculation unit 603. In a case where the acceleration acc is less than a threshold, the angular velocity correction calculation unit 603 derives the zero-point bias $\omega_{bias}$ by using the angular velocity $\omega_g$ and the estimated angular velocity $\omega_o$, and performs the zero-point calibration of the gyro sensor 406.

While, in the present exemplary embodiment, the depth camera is used as a source of the orientation information, the orientation information may be acquired by a magnetic field sensor that detects magnetism. For example, in the case of using the magnetic field sensor, magnetism near the HMD 101 is detected, and the orientation information in the three-dimensional space is acquired based on the detected magnetism. In either of the above described cases, coordinate conversion of the orientation information, derivation of the estimated angular velocity, and acquisition of the angular velocity of the gyro sensor are performed in a manner similar to the first exemplary embodiment.

Figure 7:
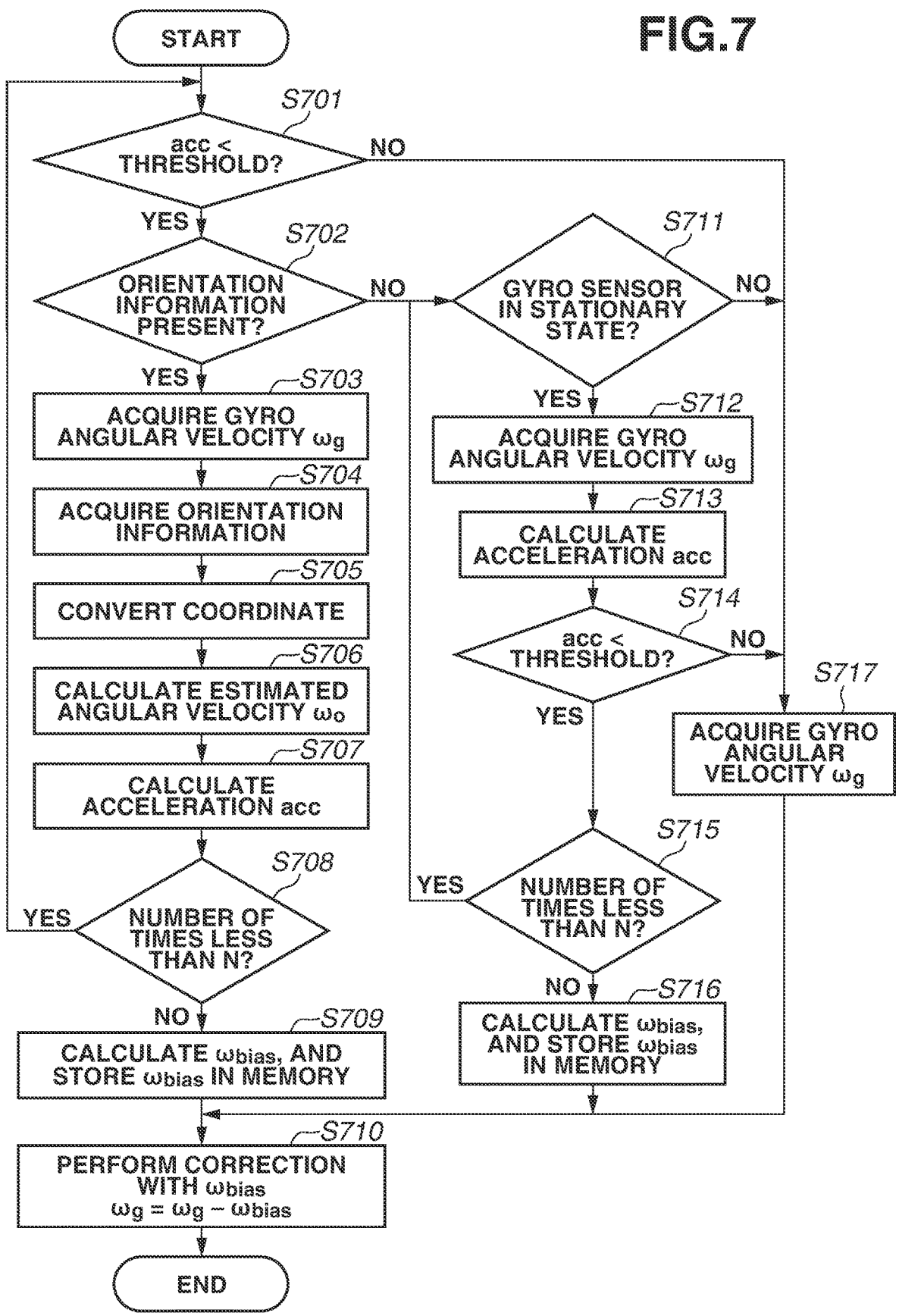
FIG. 7 is a flowchart illustrating an example of angular velocity detection processing according to the second exemplary embodiment.

Next, the angular velocity detection processing by the angular velocity detection device according to the second exemplary embodiment is described. FIG. 7 is a flowchart illustrating an example of the angular velocity detection processing according to the second exemplary embodiment. In the processing illustrated in FIG. 7, the angular velocity $\omega_g$, the information about presence/absence of the orientation information, and the information about the acceleration acc have been already acquired as an initial condition. In step S701, the angular velocity detection device determines whether the acceleration acc is less than the threshold. In a case where it is determined whether the acceleration acc is less than a predetermined value, it is possible to reduce a processing load and to avoid occurrence of a correction error by inhibiting the correction processing when sudden motion occurs. In a case where it is determined that the acceleration acc is less than the threshold (YES in step S701), the processing proceeds to step S702. In a case where it is determined that the acceleration acc is greater than or equal to the threshold (NO in step S701), the processing proceeds to step S717.

In step S702, the angular velocity detection device determines presence/absence of the orientation information. In a case where it is determined that the orientation information is present (YES in step S702), the processing proceeds to step S703. In a case where it is determined that the orientation information is absent (NO in step S702), the processing proceeds to step S711.

In step S703, the angular velocity correction calculation unit 603 acquires the angular velocity $\omega_g$ detected by the gyro sensor 406. In step S704, the orientation information acquisition unit 402 acquires the user orientation information from the image captured by the depth camera 601. Next, in step S705, the coordinate conversion unit 404 performs the coordinate conversion on the orientation information in the world coordinate system acquired in step S704, to convert the orientation information into the orientation information in the sensor coordinate system. Subsequently, in step S706, the angular velocity calculation unit 405 calculates the estimated angular velocity $\omega_o$ from the orientation information in the sensor coordinate system converted in step S705. In step S707, the angular velocity correction calculation unit 603 acquires the acceleration acc detected by the acceleration sensor 602. The processing order of the processing in each of step S703 and step S707 is not limited to the processing order illustrated in FIG. 7, and the processing in each of step S703 and step S707 may be performed at any timing after the processing in step S702 and before processing in step S708.

Next, in step S708, the angular velocity detection device determines whether the number of execution times of the processing in steps S703 to S707 is less than the designated number of times N. In a case where it is determined that the number of execution times of the processing in steps S703 to S707 is less than the designated number of times N (YES in step S708), the processing returns to step S701. Meanwhile, in a case where it is determined that the number of execution times of the processing in steps S703 to S707 is not less than the designated number of times N, namely, in a case where it is determined that the processing in steps S703 to S707 is performed the designated number of times N (NO in step S708), the processing proceeds to step S709. In step S709, the angular velocity correction calculation unit 603 calculates the zero-point bias $\omega_{bias}$ based on the angular velocity $\omega_g$ and the estimated angular velocity $\omega_o$ acquired by the above-described processing, and stores the zero-point bias $\omega_{bias}$ in the memory.

In step S710, the angular velocity correction calculation unit 603 corrects the angular velocity $\omega_g$ from the gyro sensor 406 by using the zero-point bias $\omega_{bias}$, and outputs the corrected angular velocity $\omega_g$. As a result, the output of the gyro sensor 406 can be appropriately corrected by using the zero-point bias $\omega_{bias}$.

In a case where it is determined in step S702 that the orientation information is absent (NO in step S702), control to perform zero-point calibration of the gyro sensor 406 in the stationary state is performed. In step S711, the angular velocity detection device determines whether the gyro sensor 406 is in the stationary state. In a case where it is determined that the gyro sensor 406 is in the stationary state (YES in step S711), the processing proceeds to step S712. In a case where it is determined that the gyro sensor 406 is not in the stationary state (NO in step S711), the processing proceeds to step S717.

In step S712, the angular velocity correction calculation unit 603 acquires the angular velocity $\omega_g$ detected by the gyro sensor 406. In step S713, the angular velocity correction calculation unit 603 acquires the acceleration acc detected by the acceleration sensor 602. The processing in step S712 and step S713 may be performed in an optional order. The processing in step S712 may be performed after the processing in step S713 is performed. In step S714, the angular velocity detection device determines whether the acceleration acc acquired in step S713 is less than the threshold. In a case where it is determined that the acceleration acc is less than the threshold (YES in step S714), the processing proceeds to step S715. In a case where it is determined that the acceleration acc is greater than or equal to the threshold (NO in step S714), the processing proceeds to step S717.

Next, in step S715, the angular velocity detection device determines whether the number of execution times of the processing in steps S712 to S714 is less than the designated number of times N. In a case where it is determined that the number of execution times of the processing in steps S712 to S714 is less than the designated number of times N (YES in step S715), the processing returns to step S711. Meanwhile, in a case where it is determined that the number of execution times of the processing in steps S712 to S714 is not less than the designated number of times N, namely, in a case where it is determined that the processing in steps S712 to S714 is performed the designated number of times N (NO in step S715), the processing proceeds to step S716. In step S716, the angular velocity correction calculation unit 603 calculates the zero-point bias $\omega_{bias}$ based on the angular velocity $\omega_g$ acquired by the above-described processing, and stores the zero-point bias $\omega_{bias}$ in the memory. The processing then proceeds to step S710.

In the case where it is determined in step S701 or step S714 that acceleration acc is greater than or equal to the threshold, the processing proceeds to step S717. In step S717, the angular velocity correction calculation unit 603 acquires the angular velocity $\omega_g$ detected by the gyro sensor 406. The processing then proceeds to step S710. In other words, in the case where it is determined that the acceleration acc is greater than or equal to the threshold, only acquisition of the angular velocity $\omega_g$ is performed without performing the correction processing. When sudden motion occurs, the orientation information not suitable for the correction and the estimated angular velocity obtained from such orientation information are prevented from being used in the correction in the above-described manner. This makes it possible to reduce the processing load. Further, in the case where it is determined in step S711 that the gyro sensor 406 is not in the stationary state, the angular velocity correction calculation unit 603 acquires, in step S717, the angular velocity $\omega_g$ detected by the gyro sensor 406, and the processing then proceeds to step S710. In these cases, the zero-point bias $\omega_{bias}$ is not calculated. In the case where the zero-point bias $\omega_{bias}$ has been already calculated, the angular velocity $\omega_g$ from the gyro sensor 406 is corrected by using the known zero-point bias $\omega_{bias}$.

As with the first exemplary embodiment, the processing illustrated in FIG. 7 is periodically performable. Further, start of the execution of the processing illustrated in FIG. 7 can be instructed from a user interface. In this case, the user can start the correction at any timing.

The disclosure can be realized by supplying a program realizing one or more functions of the above-described exemplary embodiments to a system or an apparatus through a network or a storage medium and causing one or more processors in a computer of the system or the apparatus to read out and execute the program. Further, the disclosure can be realized by a circuit (e.g., application specific integrated circuit (ASIC)) realizing one or more functions.

Figure 8:
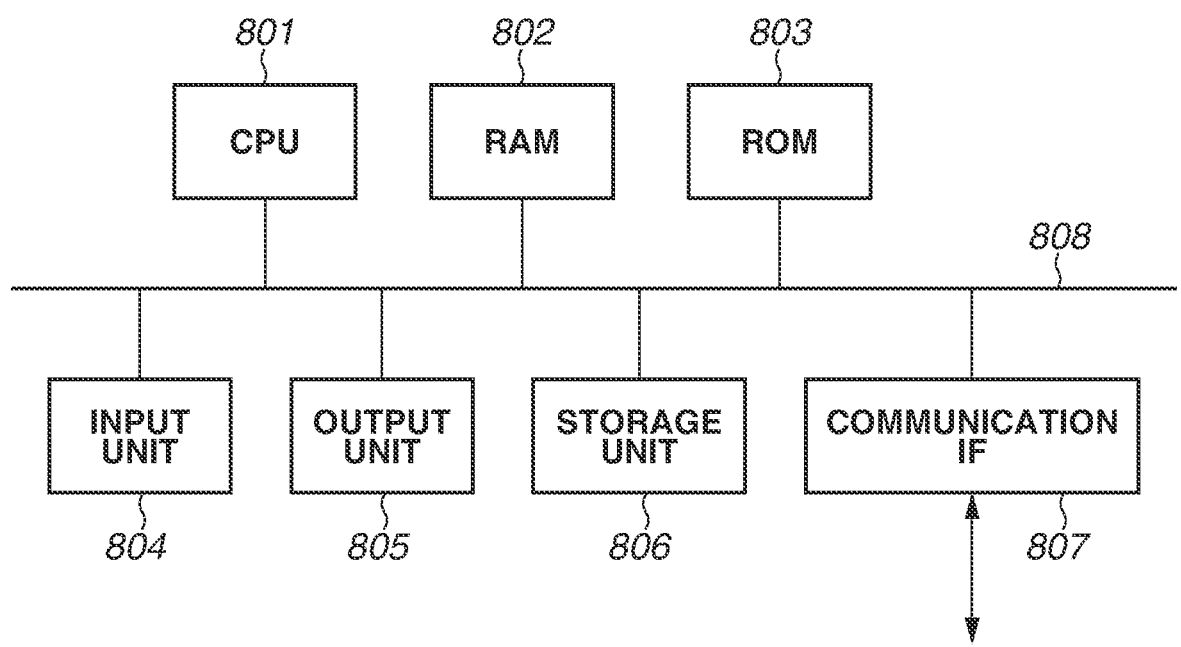
FIG. 8 is a diagram illustrating a hardware configuration example of a head mounted display (HMD) according to the present exemplary embodiment.

FIG. 8 is a block diagram illustrating an example of a hardware configuration of the HMD as an image display apparatus according to the present exemplary embodiment. As illustrated in FIG. 8, the HMD includes a central processing unit (CPU) 801, a random access memory (RAM) 802, a read only memory (ROM) 803, an input unit 804, an output unit 805, a storage unit 806, and a communication interface (IF) 807. The CPU 801, the RAM 802, the ROM 803, the input unit 804, the output unit 805, the storage unit 806, and the communication IF 807 are connected with each other via a system bus 808 to communicate with each other.

The CPU 801 controls each of the units connected to the system bus 808. The RAM 802 is used as a main storage device of the CPU 801. The ROM 803 stores, for example, an activation program of the apparatus. When the CPU 801 reads out a program from the storage unit 806 and executes the program, for example, the angular velocity detection processing according to each of the above-described exemplary embodiments is realized.

The input unit 804 receives input, etc. from the user, and receives image data. The input unit 804 includes, for example, the gyro sensor (angular velocity sensor) and the camera. The output unit 805 outputs image data, a result of the processing by the CPU 801, etc. The storage unit 806 is a nonvolatile storage device that stores control programs relating to operation and processing of the apparatus. The communication IF 807 controls information communication between the apparatus and the other apparatus.

When the apparatus having the above-described configuration is turned on, the CPU 801 reads the control programs, etc. from the storage unit 806 to the RAM 802 based on the activation program stored in the ROM 803. The CPU 801 performs the processing based on the control programs, etc. read in the RAM 802, thereby realizing the functions of the HMD. In other words, the CPU 801 of the HMD performs the processing based on the control programs, etc., to realize the functional configuration and the operation of the HMD and the angular velocity detection device.

The above-described exemplary embodiments merely illustrate concrete examples of implementing the disclosure, and the technical scope of the disclosure is not to be construed in a restrictive manner by the exemplary embodiments. In other words, the disclosure may be implemented in various modes without departing from the technical spirit or main features thereof.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-174087, filed Sep. 25, 2019, which is hereby incorporated by reference herein in its entirety.

What is claimed is:

1. A head mounted display comprising:
    a camera configured to capture an image of a real space;
    an angular velocity sensor configured to detect angular velocity;
    at least one processor; and
    a memory coupled to the at least one processor storing instructions that when executed by the at least one processor, perform to:
    acquire orientation information of the head mounted display;
    calculate estimated angular velocity based on the orientation information; and
    correct an output of the angular velocity sensor by using a calculated zero-point bias of the angular velocity sensor,
    wherein the acquire acquires the orientation information by detecting a marker or a natural feature of the real space captured in the image, and
    wherein the calculated zero-point bias is calculated by using the detected angular velocity and the calculated estimated angular velocity.

2. The head mounted display according to claim 1, wherein the at least one processor further performs zero-point calibration of the angular velocity sensor based on the detected angular velocity and the calculated estimated angular velocity.

3. The head mounted display according to claim 1, wherein the at least one processor further performs to convert the acquired orientation information in a world coordinate system into orientation information in a coordinate system of the angular velocity sensor,
    wherein the calculate calculates the estimated angular velocity based on the converted orientation information.

4. The head mounted display according to claim 1, wherein the acquire detects the orientation information in the real space on the head mounted display by using invisible light.

5. The head mounted display according to claim 1, wherein whether the correct performs correction of the output of the angular velocity sensor by using the orientation information is changed based on presence/absence of the acquired orientation information.

6. The head mounted display according to claim 1, wherein the at least one processor further performs to determine whether the angular velocity sensor is in a stationary state in a case where the acquired orientation information is absent,
    wherein, in a case where the determine determines that the angular velocity sensor is in the stationary state, the correct calculates zero-point bias of the angular velocity sensor based on the detected angular velocity, and corrects the output of the angular velocity sensor by using the calculated zero-point bias.

7. The head mounted display according to claim 1, wherein the correct changes a method of correcting the output of the angular velocity sensor based on acceleration of the camera.

8. The head mounted display according to claim 1, wherein, in a case where acceleration of the head mounted display is greater than or equal to a threshold, the output of the angular velocity sensor is not corrected.

9. The head mounted display according to claim 1, further comprising:
    a display configured to display a combined image of the image of the real space captured by the camera and an image of a virtual space, the combined image being combined with reference to the angular velocity output from the angular velocity sensor.

10. An angular velocity detection method of a head mounted display, the method comprising:
    detecting angular velocity by an angular velocity sensor of the head mounted display;
    acquiring orientation information of the head mounted display;
    calculating estimated angular velocity based on the acquired orientation information; and
    correcting an output of the angular velocity sensor by using a calculated zero-point bias of the angular velocity sensor,
    wherein the head mounted display includes a camera for capturing an image of the real space,
    wherein the acquiring acquires the orientation information by detecting a marker or a natural feature of the real space captured in the image, and
    wherein the calculated zero-point bias is calculated by using the detected angular velocity and the calculated estimated angular velocity.

11. A non-transitory computer-readable storage medium storing a program that causes a computer to perform:
    detecting angular velocity by an angular velocity sensor of a head mounted display;

acquiring orientation information of the head mounted display;

calculating estimated angular velocity based on the acquired orientation information; and correcting an output of the angular velocity sensor by using a calculated zero-point bias of the angular velocity sensor, wherein the head mounted display includes a camera for capturing an image of the real space, wherein the acquiring acquires the orientation information by detecting a marker or a natural feature of the real space captured in the image, and wherein the calculated zero-point bias is calculated by using the detected angular velocity and the calculated estimated angular velocity.

12. The non-transitory computer-readable storage medium according to claim 11, wherein the correcting performs zero-point calibration of the angular velocity sensor based on the detected angular velocity and the calculated estimated angular velocity.

13. The non-transitory computer-readable storage medium according to claim 11, further comprising converting the orientation information in a world coordinate system acquired by the acquiring into orientation information in a coordinate system of the angular velocity sensor, wherein the calculating calculates the estimated angular velocity based on the converted orientation information.

14. The method according to claim 10, wherein the correcting performs zero-point calibration of the angular velocity sensor based on the detected angular velocity and the calculated estimated angular velocity.

15. The method according to claim 10, further comprising converting the orientation information in a world coordinate system acquired by the acquiring into orientation information in a coordinate system of the angular velocity sensor, wherein the calculating calculates the estimated angular velocity based on the converted orientation information.

* * * * *